United States Patent [19]

Schmidt

[11] Patent Number: 5,690,779
[45] Date of Patent: Nov. 25, 1997

[54] METHOD FOR THE PRODUCTION OF A COATED PLATE

[75] Inventor: Guenther Schmidt, Tamm, Germany

[73] Assignee: Robert Bosc GmbH, Stuttgart, Germany

[21] Appl. No.: 472,079

[22] Filed: Jun. 6, 1995

[30] Foreign Application Priority Data

Jun. 29, 1994 [DE] Germany ............... 44 22 734.5

[51] Int. Cl.$^6$ .................................. B32B 31/16
[52] U.S. Cl. .................... 156/324; 156/252; 156/253; 156/269
[58] Field of Search ................. 156/324, 252, 156/253, 263, 269

[56] References Cited

U.S. PATENT DOCUMENTS

| | | | |
|---|---|---|---|
| 3,238,079 | 3/1966 | Mitchell | 156/252 |
| 3,752,723 | 8/1973 | Bruneau | 156/324 |
| 4,379,010 | 4/1983 | Renger | 156/263 |
| 4,555,291 | 11/1985 | Tait | 156/263 |
| 4,780,168 | 10/1988 | Beisang | 156/263 |
| 4,946,530 | 8/1990 | Lam | 156/252 |

FOREIGN PATENT DOCUMENTS 57-75233  5/1982  Japan ................. 156/263

*Primary Examiner*—Daniel Stemmer
*Attorney, Agent, or Firm*—Edwin E. Griegg; Ronald E. Greigg

[57] ABSTRACT

The invention relates to a method and an apparatus for the production of a plate with depressions or apertures which is coated on at least one side. Plates of this kind are employed, for example, as passage-containing plates in hydraulic blocks for ABS/ASR/VDC systems, the depressions or apertures serving as passages or holes and the coating being a seal. In this invention the depressions or apertures are formed in an uncoated plate and then the plate is coated. As a result, the life of the machining tools is extended, the machining tolerances become smaller and the rate of machining can be increased.

7 Claims, 4 Drawing Sheets

METHOD FOR THE PRODUCTION OF A COATED PLATE

PRIOR ART

The proposal is for a method and an apparatus for the production of a plate which is coated on one or both sides and is provided with depressions or apertures.

Plates of this kind are used, for example, as passage-containing plates in a hydraulic block which has a passage-containing plate which is screwed to a carrier plate on one side or to two carrier plates, one on each side. The depressions or apertures form passages for a hydraulic fluid, these being covered by the carrier plates. The coating serves as a seal which seals off the passage-containing plate from the carrier plates. Such hydraulic blocks are used in ABS (antilock brake system)/ASR (antislip regulation)/VDC (vehicle dynamics control) hydraulic systems.

The seal has elastic or plasto-elastic properties. It is creep-resistant and guarantees a permanent seal between the passage-containing plate and the carrier plates. The seal is also resistant to the hydraulic fluid to be used, in said hydraulic systems therefore against brake fluid.

To produce a prior art passage-containing plate, a plate is covered on one or both sides with a coating as a seal, e.g. by sticking on a preferably self-adhesive film, by welding on or by pressing on. The plate itself generally consists of metal or, alternatively, of plastic.

After coating with the seal, the depressions or apertures are made in the plate by, for example, milling, punching or drilling. For this purpose, the machining tools used must be designed for different materials, namely for the sealing material and for the material of which the plate consists. Additional problems arise if an adhesive by means of which the seal is bonded to the plate leads to plate material which has been removed and fragments of the seal sticking to the machining tool.

ADVANTAGES OF THE INVENTION

By producing a plate in accordance with the method described, the machining tools need only be designed for the plate material. This extends their life and reduces the machining tolerances. The machining rate can be increased and the machining tool and the machine carrying out the machining can be cleaned without problems.

The inventive plate is preferably produced from strip material, in particular from sheet metal, in which the depressions or apertures for the individual plates are made continuously in succession. The strip is subsequently cut up into the individual plates. As a coating, a film unwound from a supply drum is, for example, applied to the plate or strip material. For coating on both sides, two such films are applied to the two sides of the plate.

After the application of the coating or film, the film is removed from the depressions or apertures again. It is sufficient here to remove the film at those points at which connections to the depressions or apertures of the plate are intended. In the remaining areas of the depressions or apertures, the film can be left. Since the film has a low thickness, it has little resistance to bending. Film remaining in the area of the depressions or apertures thus does not influence the surface pressure, decisive for the sealing effect, during the clamping together of the plate with parts which interact with it, for instance during the screwing of a passage-containing plate produced in accordance with the invention to two carrier plates to form a hydraulic block.

The removal of the film from the depressions or apertures can be accomplished in a manner known per se by severing, for example by cutting, punching or piercing. It is also possible to remove the film from the depressions or apertures by subjecting the film to the action of a fluid under pressure, for instance by means of compressed air or a liquid. This can take place, in particular, after the assembly of the unit for which the plate is intended. This method not only eliminates the need for special film severing tools but also allows the unit to be tested for tightness, on the one hand, and, on the other hand, for the presence of the intended hydraulic connections.

It is possible for the coating or film to be removed from the depressions or apertures in the plate only immediately before the latter is used, and, as a result, the depressions or apertures remain protected from soiling or corrosion.

BRIEF DESCRIPTION OF THE DRAWINGS

The invention is explained below in greater detail with reference to the drawing, in which.

DETAILED DESCRIPTION

Figure 1:
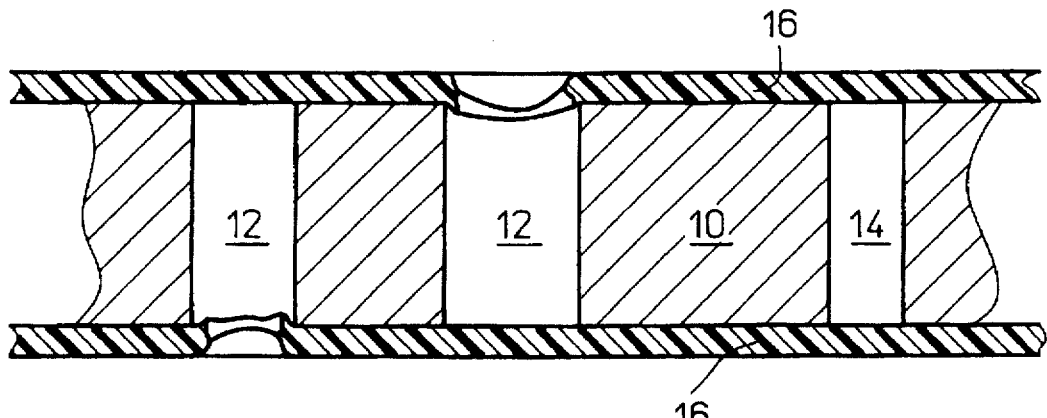
FIG. 1 shows a plate produced in accordance with the invention, in section.

FIG. 1 shows a plate 10 produced in accordance with the invention, which is intended for use as a passage-containing plate. The passage-containing plate 10 is made of metal and has punched passages 12 and holes 14 which are open at the top and bottom and the arrangement and shape of which is shown by way of example in FIG. 2. The passage-containing plate 10 is covered on both sides with self-adhesive synthetic elastomer films 16, which are provided as seals. The films 16 are removed from the passages 12 in those areas in which the intention is to connect the passages 12 to the outside (FIG. 3). This piercing or removal of the films 16 or coatings at the connection points can also be accomplished by means of a pressure medium (FIG. 4).

Figure 2:
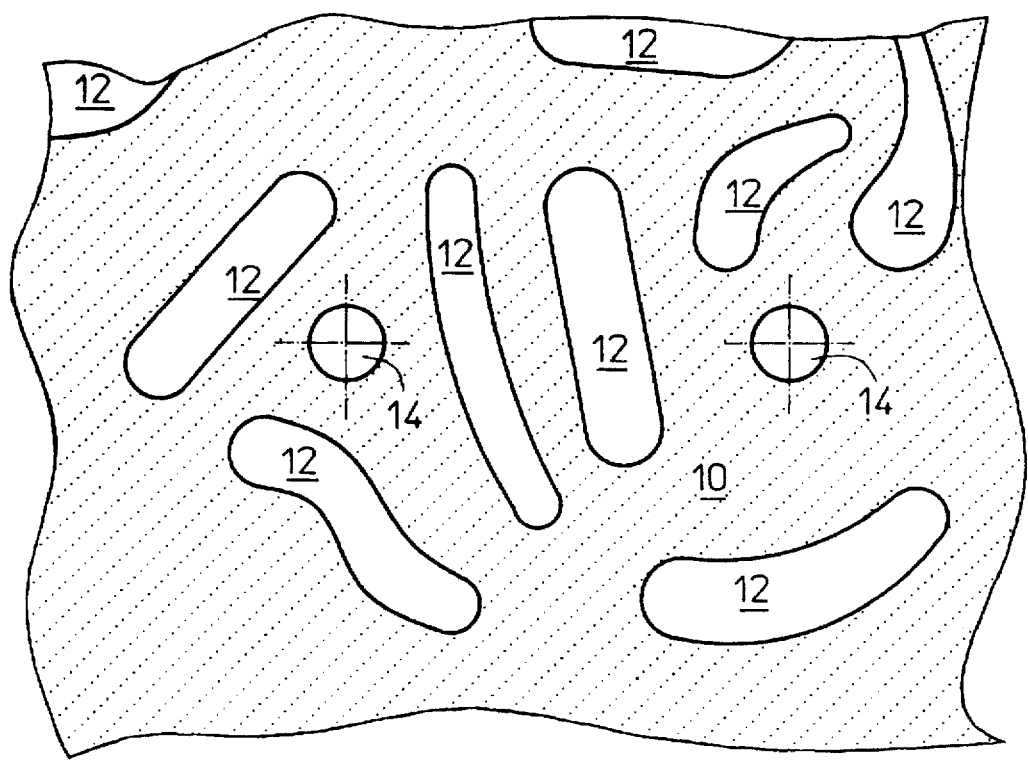
FIG. 2 shows an elevation of a plate produced in accordance with the invention.
Figure 3:
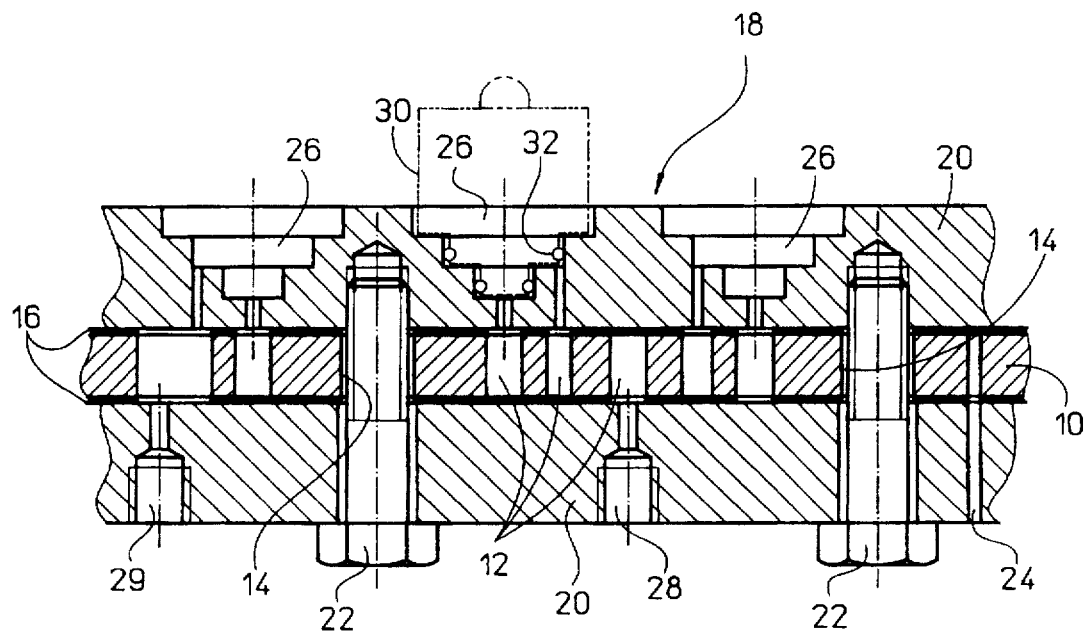
FIG. 3 shows a hydraulic block which has been assembled using a plate produced in accordance with the invention as a passage-containing plate.

FIG. 3 shows a section through a hydraulic block, denoted overall by 18, in which a film-coated passage-containing plate 10 in accordance with FIGS. 1 and 2 is arranged between two carrier plates 20. The three plates 10, 20 are clamped together by means of screws 22. The carrier plates 20 have various different holes 24, stepped holes 26 and threaded holes 28 for the connection of hydraulic components. In FIG. 3, a solenoid valve 30 is indicated in broken lines by way of example, said valve being inserted into one of the stepped holes 26 and being sealed off at two stages of a stepped hole 26 by means of two sealing rings 32.

Figure 4:
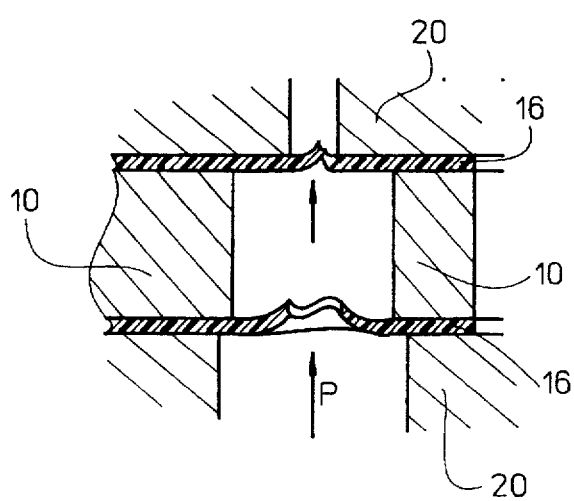
FIG. 4 shows a detail of a hydraulic block in accordance with FIG. 3, in section.

FIG. 4 shows a section through one area of a coated passage-containing plate 10 and carrier plates 20, in which the coating 16 has been pierced by means of fluid pressure. In the illustration, the pressure acted from below (Arrow P).

Figure 5:
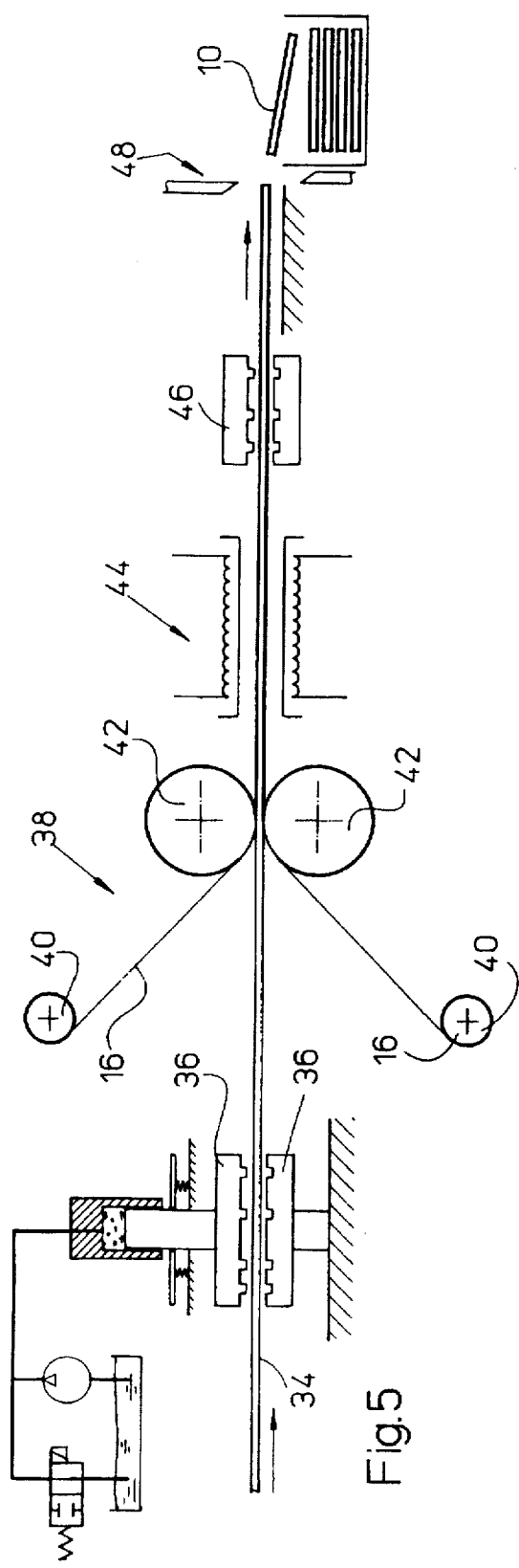
FIG. 5 shows an apparatus for the production of passage-containing plates by means of the method in accordance with the invention.

FIG. 5 shows an apparatus in accordance with the invention for the production of passage-containing plates 10 of the type shown in FIGS. 1 to 4. The starting material used is a metal sheet 34 which comes from a reel (not shown) and first of all passes through a hydraulically actuated punching tool 36. The passages 12 and holes 14 depicted in FIGS. 1 or 2 are punched out of the metal sheet 34 by means of the punching tool 36.

Figure 6:
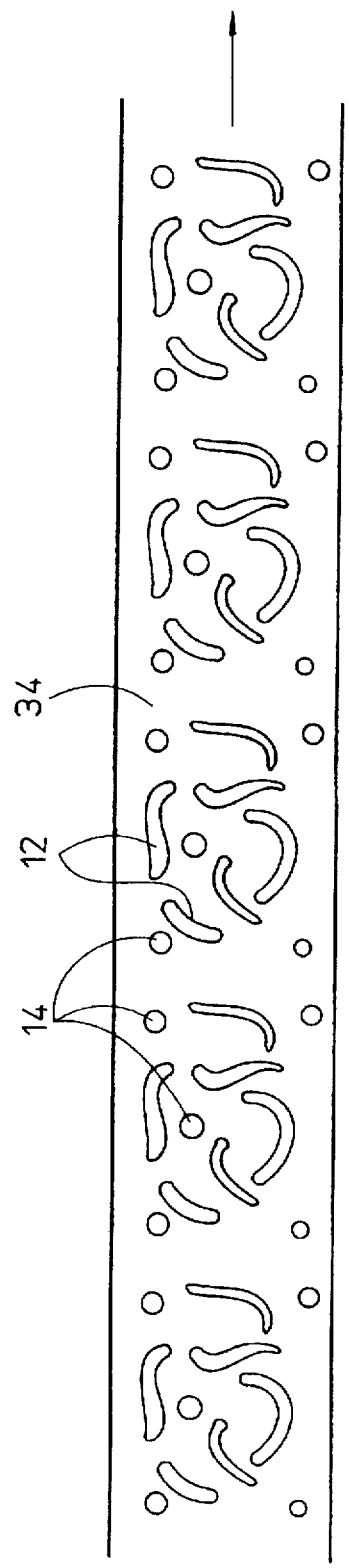
FIG. 6 shows a strip material with punched passages and holes.

FIG. 6 shows the metal sheet 34 after punching. During the punching operation, the metal sheet 34 is halted, or a punch which periodically moves along with the sheet and then returns allows a continuous strip transport speed and hence a constant speed of rotation of the reel and film applying device.

After the punching, the metal sheet 34 passes through a film applying device 38 for the application of two films 16, one to the upper side and one to the underside of the metal sheet 34. The films 16 are self-adhesive, are each unwound from a supply reel 40 and are pressed onto the upper side and underside, respectively, of the metal sheet 34 by two nip rollers 42 rotating in opposite directions. It is also possible to roll the films 16 onto the upper side and underside of the metal sheet 34 without a layer of adhesive. Pressing the film 16 against the metal sheet 34 gives rise to structural changes which result in a permanent bond between the film 16 and the metal sheet 34. The nip rollers 42 can be heated.

The peripheral speed of the nip rollers 42 is always equal to the speed of the metal sheet 34. When the metal sheet 34 is halted during the punching operation, the nip rollers 42 are likewise halted. It is also possible to obtain a constant sheet and roller speed by means of punches 36, 46 and cutting devices 48 which periodically move along with the sheet and then return.

After the film applying device 38, the now coated metal sheet 34 passes through a drying or cooling station 44 known per se. The metal sheet 34 can then be wound onto another reel (likewise not shown), which is transferred to a second production site, where the metal sheet 34 is cut up into individual passage-containing plates 10 and the films 16 are removed from the passages.

In the apparatus depicted in FIG. 5, after the drying or cooling station 44 the coated metal sheet 34 passes through a film punching device 46, by means of which the films 16 are removed at those points of the passages 12 at which connections for hydraulic components are intended (cf. FIGS. 1 and 3). The films 16 can likewise be removed from the holes 14 for the insertion of the screws 22.

The film punching device 46 operates in time with the punching tool 36.

After the film punching device 46, the metal sheet 34 is cut up into individual passage-containing plates 10 and stacked by means of a cutting device 48.

Figure 7:
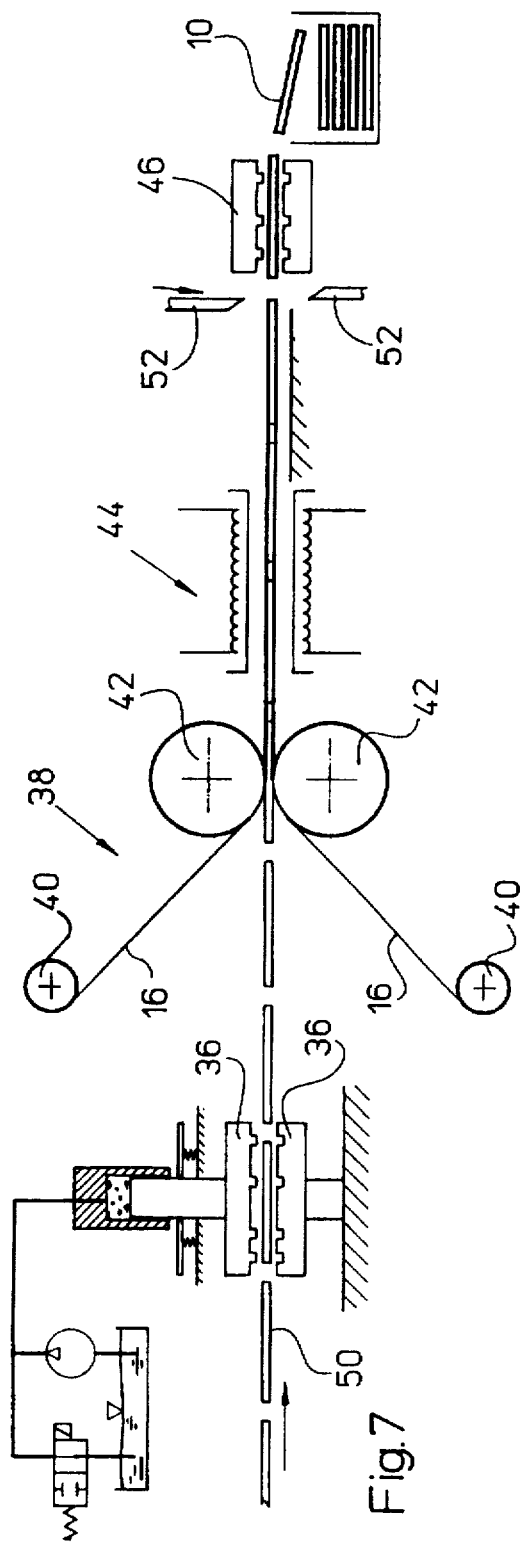
FIG. 7 shows another apparatus for carrying out the method in accordance with the invention.

FIG. 7 shows an apparatus, similar to the apparatus shown in FIG. 5, in which individual plates 50 are processed to give passage-containing plates 10 (the same reference numerals are used for identical parts). The individual plates 50, which are of the size of the passage-containing plates 10 to be produced, are fed to the apparatus in FIG. 6 from the left. They pass first of all into a hydraulically actuated punching tool 36 by means of which the passages 12 and the holes 14 (cf. FIGS. 1 to 3) are punched out of the individual plates 50.

Figure 8:
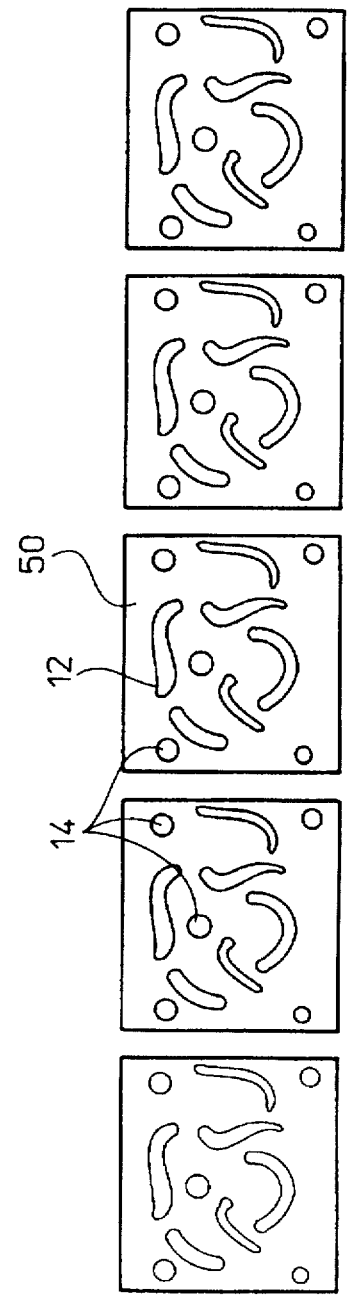
FIG. 8 shows individual plates with punched passages and holes.

FIG. 8 shows the punched individual plates 50 in plan view.

After leaving the punching tool 36, the individual plates 50 are fed to a film applying device 38. By means of the film applying device 38, as already described in relation to FIG. 5, plastic films 16 are unwound from two supply reels 40 and applied to the upper side and underside of the individual plates 50 by means of two nip rollers 42. The long plastic films 16 connect the individual plates 50 to one another.

From the film applying device 38, the now interconnected individual plates 50 pass into a drying or cooling station 44. The plastic films 16 are then cut up between the individual plates 50 by means of a film shear 52. A film punching device 46 removes the films 16 from the passages 12 at least in those areas in which connections of hydraulic components are intended and from the holes 14. The passage-containing plates 10 produced in this way are stacked.

To protect the passages 12 and the holes 14, the plastic films 16 can remain on the passage-containing plates 10 until they are used. It is also possible to leave the films 16 on the passage-containing plate during the assembly of a hydraulic block 18, depicted by way of example in FIG. 3. As the screws 22 are introduced through the carrier plates 20 and passage-containing plates 10, the coatings or films 16 are pierced, the displaced material remaining in the holes 14. The films 16 are then removed from the passages 12 at the connection points by pressurization with a fluid, which is fed in through the holes 24, stepped holes 26, threaded holes 28 (FIG. 4) serving as connections. A tightness test and a function test can simultaneously be carried out on the hydraulic block 18 to determine whether the connections envisaged exist and that no unintended connections are present. Gases, for example air, and liquids such as, for example, the operating fluid for the hydraulic block, are suitable as the fluid for severing the films at the connection points.

The foregoing relates to preferred exemplary embodiments of the invention, it being understood that other variants and embodiments thereof are possible within the spirit and scope of the invention, the latter being defined by the appended claims.

I claim:

1. A method of forming a plate for use in a hydraulic block of a brake system which comprises:
    forming an elongated continuous strip of metal of a desired thickness and width, said continuous strip having first and second surfaces;
    forming holes in said continuous strip of metal in duplicate patterns in successive areas of said continuous strip;
    forming passages having a shape different than the shape of said holes in said metal plate in areas other than where said holes are formed, said passages also formed in duplicate patterns in successive areas of said continuous strip;
    laminating each of said first and second surfaces of said strip of metal plate with a film of sealant material thereby covering said holes and passages; and
    removing said film from areas of some of said holes and passages.

2. A method as set forth in claim 1 in which pressure is applied to remove said film from some of said holes and passages.

3. A method as set forth in claim 1 in which said elongated continuous strip is cut into equal sections which include identical configurations of holes and passages.

4. A method as set forth in claim 2 in which said elongated continuous strip is cut into equal sections which include identical configurations of holes and passages.

5. A method for producing a hydraulic block, said hydraulic block comprising: a first carrier plate having a first carrier plate surface; a plate having first and second surfaces, a plurality of holes in said plate, a plurality of passages having a different shape than the shape of said holes, said passages being in areas other than areas which include said holes, said plate having a film of sealant material on each of said first and second surfaces, said first surface of said plate facing said first carrier plate surface of said first carrier plate; a second carrier plate having a second carrier plate surface, said second carrier plate surface facing said second surface of said plate, each of said first and second carrier plates having apertures therethrough, at least one carrier plate carrying at least one valve means in communication with at least one of said apertures, with an aperture in said first carrier plate, an aperture in said second carrier plate, and a passage in said plate in alignment with each other, said method comprising the steps of: forming a plurality of holes in said plate; forming a plurality of passages in said plate in areas other than areas including said holes, said passages having a shape different than the shape of said holes in said metal plate; applying a film of a sealant material on said first and second surfaces of said plate thereby covering said holes and said passages; positioning said first carrier plate with its first carrier plate surface facing said film of sealant material on said first surface of said plate; positioning said second carrier plate with its second carrier plate surface facing said film of sealant material on said second surface of said plate; clamping together said first and second carrier plates with said plate covered with said films of sealant material between said first and second carrier plates in a position such that an aperture in said first carrier plate, an aperture in said second carrier plate, and a passage in said plate are in alignment with each other; and applying a pneumatic or hydraulic pressure to said aligned apertures and passage to fracture said films coveting said passage.

6. The method as claimed in claim 5, which comprises before applying said first and second carrier plates onto said plate, forming said holes and said passages continuously in a continuous strip of metal, and applying first and second films of the sealant material continuously onto said continuous strip thereby covering said holes and passages.

7. The method as claimed in claim 5 which comprises before applying said first and second carrier plates onto said plate dividing a strip of metal into single plates, cutting apertures through each plate and applying said first and second films onto said first and second surfaces of said plate by feeding said plates in succession to a film applying device.

* * * * *

UNITED STATES PATENT AND TRADEMARK OFFICE
CERTIFICATE OF CORRECTION

PATENT NO.  : 5,690,779
DATED       : November 25, 1997
INVENTOR(S) : Guenther Schmidt It is certified that error appears in the above-indentified patent and that said Letters Patent is hereby corrected as shown below:

On the title page
[73] Assignee: Robert Bosch GmbH, Stuttgart, Germany

Signed and Sealed this

Twentieth Day of October, 1998

Attest:

BRUCE LEHMAN

Attesting Officer      Commissioner of Patents and Trademarks